(12) United States Patent
Wu et al.

(10) Patent No.: US 10,200,707 B2
(45) Date of Patent: Feb. 5, 2019

(54) VIDEO BIT STREAM DECODING

(71) Applicant: Microsoft Technology Licensing, LLC, Redmond, WA (US)

(72) Inventors: Yongjun Wu, Bellevue, WA (US); Shyam Sadhwani, Bellevue, WA (US); Bakkama Srinath Reddy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 480 days.

(21) Appl. No.: 14/927,127

(22) Filed: Oct. 29, 2015

(65) Prior Publication Data
US 2017/0127074 A1 May 4, 2017

(51) Int. Cl.
*H04N 19/44* (2014.01)
*H04N 19/423* (2014.01)

(52) U.S. Cl.
CPC ........... *H04N 19/44* (2014.11); *H04N 19/423* (2014.11)

(58) Field of Classification Search
CPC ...................................................... H04N 19/44
See application file for complete search history.

(56) References Cited

U.S. PATENT DOCUMENTS

| 8,170,096 B1 * | 5/2012 | Haberman | H04N 19/513 375/240.01 |
| 9,332,090 B1 * | 5/2016 | Fallows | H04L 67/02 |
| 2011/0119487 A1 * | 5/2011 | Alexander | H04L 9/0891 713/160 |
| 2012/0106622 A1 | 5/2012 | Huang et al. | |
| 2012/0320970 A1 | 12/2012 | Drugeon et al. | |
| 2013/0114736 A1 | 5/2013 | Wang et al. | |
| 2014/0003525 A1 | 1/2014 | Fuldseth | |

FOREIGN PATENT DOCUMENTS

GB  2509966 A1  7/2014

OTHER PUBLICATIONS

"10-bit and 16-bit YUV Video Formats", Published on: Oct. 13, 2011, Available at: https://msdn.nnicrosoft.com/en-us/library/windows/desktop/bb970578(v=vs.85).aspx.
Smith, Matt, "Preparing for HEVC, the Next Great Video Codec", Published on: Feb. 4, 2015, Available at: http://www.digitaltrends.com/computing/h-265-hevc-encoding-explained/.

(Continued)

*Primary Examiner* — James M Pontius
(74) *Attorney, Agent, or Firm* — Ray Quinney & Nebeker, P.C.; Thomas M. Hardman; Sunah K. Lee

(57) ABSTRACT

Aspects extend to methods, systems, and computer program products for video bit stream decoding. Aspects include flexible definition and detection of surface alignment requirements for decoding hardware. Surface alignment requirements can be handled by render cropping (e.g., cropping at a video output device), through adjustment and modification of original syntax values in a video bit stream and relaxed media type negotiation in a software (host) decoder. Resolution changes can be hidden with the aligned surface allocation when applicable. Performance can be improved and power consumption reduced by using hidden resolution changes.

20 Claims, 2 Drawing Sheets

(56) References Cited

OTHER PUBLICATIONS

Sullivan, et al., "DirectX Video Acceleration Specification for High Efficiency Video Coding (HEVC)", Published on: Aug. 9, 2013, Available at: http://www.microsoft.com/en-in/download/confirmation.aspx?id=39947.
"The Emergence of H.265 (HEVC) and 10-BIT Color Formats", Published on: Apr. 2014, Available at; http://leavcom.com/2014f/imgtec_f040014.php.
Puri, Atul, "Enabling HEVC: Intel Media SDK 2014", In White Paper, Mar. 25, 2014, 32 pages.
Kowaliski, Cyril, "New Intel IGP Drivers add H.265, VP9 Hardware Decode Support", In Technical Report, Jan. 5, 2015, 5 pages.
Ozer, Jan, "The Future of HEVC: It's Coming, but with Plenty of Questions", In Publication of Streaming Media Magazine, Apr. 2013, 6 pages.
Cho, et al., "HEVC Hardware Decoder Implementation for UHD Video Applications", In Proceedings of Acoustics, Speech and Signal Processing, May 2014, 3 pages.
"HEVC 4K Real-time Hardware Decoder", Retrieved on: Jul. 8, 2015, Available at: http://www.hhi.fraunhofer.de/departrnents/video-coding-analytics/products-technologies/hevc-software-and-hardware- solutions/hevc-4k-real-time-hardware-decoder.html.
Tikekar, et al., High Efficiency Video Coding (HEVC): Algorithms and Architectures, Chapter 10—"Decoder Hardware Architecture for HEVC", In Publication of Springer, Jun. 26, 2014, pp. 303-341.

\* cited by examiner

VIDEO BIT STREAM DECODING

CROSS-REFERENCE TO RELATED APPLICATIONS

Not Applicable

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, image processing, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In some environments, video data is streamed from one computer system to another computer system over a computer network, such as, for example, the Internet. At many resolutions, transferring raw video is not practical due to the sheer volume of data. As such, compression algorithms are used to reduce the volume of data transferred over a network. A sending computer system sends compressed (encoded) video data to a receiving computer system over a network. The receiving computer system receives the compressed video data over the network. The receiving computer system then uncompresses (decodes) the compressed video data for presentation at video output device, such as, a television or computer monitor. Video data can be compressed in accordance with various different encoding formats, including H.264 (Advanced Video Coding (AVC)), High Efficiency Video Coding (HEVC) (H.265), VP8, VP9, etc.

When decoding encoded video data, some decoding operations can be handled by a software decoder (which may also be referred to as a host decoder). The software decoder can offload other decoding operations to hardware, such as, for example, to a Graphical Processing Unit (GPU) (which may also be referred to as an accelerator), for hardware decoding. Hardware decoding can be used to speed up CPU-intensive operations (e.g., inverse discrete cosine transforms (iDCTs)). Hardware decoding is often necessary for decoding HEVC contents, which are at high bit rate, high frame rate, and high resolution.

To offload a decoding operation for hardware decoding, the software decoder conveys one or more input buffers containing information needed to perform the operation. The software decoder can also form one or more output buffers for storing results from hardware decoding. Decode hardware (e.g., a GPU) accesses information from input buffers, performs the decoding operation, and outputs results to output buffers.

A video bit stream can include parameters defining a code block size, such as, for example, 8×8 pixels. The software decoder can access the parameters from the video bit stream and process data in accordance with the parameters. When decoding operations are to be offloaded to the decode hardware, the software decoder can also indicate the code block size to the hardware. The software decoder can also allocate input and output buffers of the code block size for use by the decode hardware.

However, decode hardware can have surface alignment requirements differing from a defined code block size. Surface alignment requirements essentially dictate that data be processed using a buffer size defined by the surface alignment requirements. Due to differences in software alignment requirements and defined code block size, buffers allocated by a software decoder can differ in size from buffers used within decode hardware.

For example, coding blocks in a video bit stream can be 8×8 pixels and surface alignment requirements of decode hardware can be 32×32 pixels. Thus, when offloading an operation to hardware, a software decoder indicates the 8×8 code block size to the decode hardware and allocates 8×8 pixel input and output buffers for use by the decode hardware. The decode hardware can access an 8×8 input buffer into a 32×32 internal buffer. The hardware can perform the offloaded operation on data in the 32×32 internal buffer to generate output. The output is also stored in a 32×32 internal buffer.

However, since the code block size is 8×8, the hardware has to perform additional memory operations to prepare output for direct storage in an 8×8 output buffer. These additional memory operations can be performed on a per code block basis. When processing video bit streams (which can contain large numbers of code blocks per frame), these additional memory operations decrease performance and consume significant processing and power resources at the decode hardware.

BRIEF SUMMARY

Examples extend to methods, systems, and computer program products for video bit stream decoding. Decode hardware, for decoding data from video bit streams, is queried for surface alignment requirements internal to the decode hardware. It is determined that a code block from a video bit stream is to be input to the decode hardware. The code block has an actual resolution that does not match the alignment requirements.

Syntax values for the code block are modified. The modified syntax values indicate that the code block has a purported resolution matching the surface alignment requirements. An output buffer is allocated in accordance with the surface alignment requirements. The output buffer is for receiving video data output from the decode hardware at the purported resolution. The video data at the purported resolution includes video data at the actual resolution and padding.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
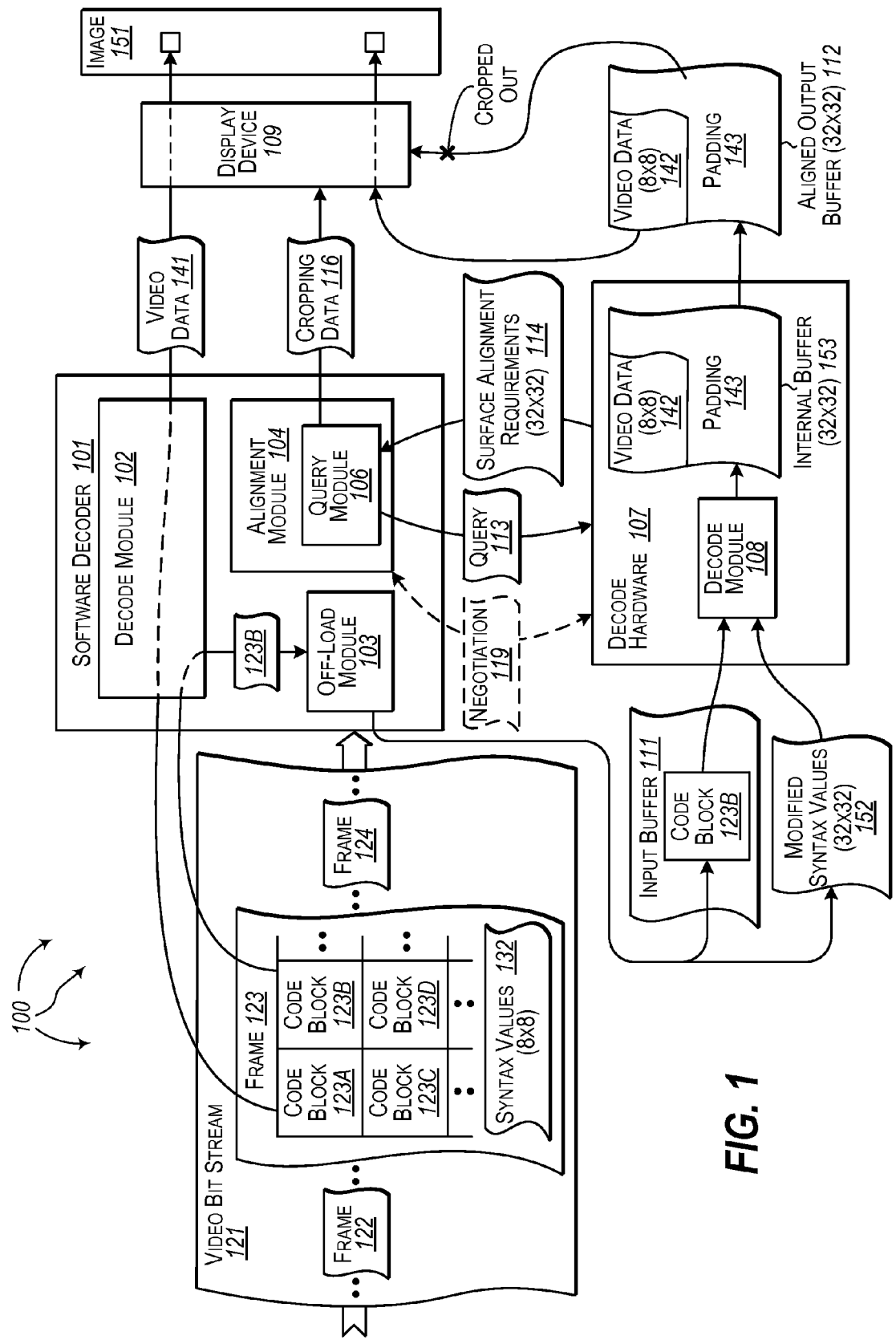
FIG. 1 illustrates an example architecture that facilitates video bit stream decoding.

Examples extend to methods, systems, and computer program products for video bit stream decoding. A software (or host) decoder queries decode hardware (e.g., a Graphical Processing Unit (GPU) or other accelerator) for surface alignment requirements internal to the decode hardware. The decode hardware returns surface alignment requirements to the software decoder.

The software decoder decodes a video bit stream having an actual resolution (e.g., code block size) that does match the surface alignment requirements. For example, code block size may be 8×8 pixels and surface alignment requirements 32×32 pixels. During decoding, the software decoder can offload operations to the decode hardware.

When an operation is to be offloaded to the decode hardware, the software decoder can modify syntax values from the video bit stream. The modified syntax values are provided to the decode hardware. The modified syntax values indicate that the video bit stream data is at a purported resolution (e.g., a purported code block size) matching the surface alignment requirements. For example, modified syntax values can indicate that code block size is also 32×32 pixels.

The software decoder can allocate one or more input buffers (possibly in accordance with the surface alignment requirements or at the purported resolution) for use by the decode hardware. Video bit stream data, such as, for example, a code block along with the modified syntax values, is stored in an input buffer.

The decode hardware accesses video bit stream data (e.g., a code block and modified syntax values) from the input buffer. The decoder hardware performs the offloaded operation on the accessed video bit stream data. The decoder hardware stores video data output from offloaded operation in an internal buffer in accordance with the surface alignment requirements. Based on the purported resolution matching the surface alignment requirements, the contents of the internal buffer can be copied essentially directly to the output buffer.

Since the actual resolution is less than the purported resolution, the output buffer includes video data at the actual resolution and padding. For example, if the actual resolution is 8×8 pixels and the surface alignment requirement is 32×32 pixels, video data at the actual resolution can be contained in the upper left 8×8 pixels of a 32×32 pixel output buffer. Remaining portions of the 32×32 output buffer may be empty or contain meaningless data (padding).

The software decoder can send the output buffer along with cropping data defining a cropping widow to a display device (e.g., a television, computer monitor, or other device screen). The cropping data indicates that data outside the sub-region containing video data at the actual resolution in the output buffer (e.g., the upper left 8×8 pixels) is to be cropped. Based on the defined cropping window, the display device renders sub-region (e.g., the upper left 8×8 pixels) from the output buffer and discards remaining output buffer contents.

Implementations may comprise or utilize a special purpose or general-purpose computer including computer hardware, such as, for example, one or more processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM,. solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, pagers, watches, fitness monitors, eye glasses, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and in the following claims, a "video bit stream" is defined as a contiguous sequence of bits representing a stream of video data transmitted over a communications path (e.g., network or local bus). A video bit stream can be encoded (e.g., compressed) according to a standard, such as, for example, H.264 (Advanced Video Coding (AVC)), High Efficiency Video Coding (HEVC) (H.265), VP8, VP9, etc.

In this description and in the following claims, a "frame" is defined as an electronically coded still image. A video bit stream can include a plurality of sequenced frames representative of video data to be presented at a display device.

In this description and in the following claims, a "code block" is defined as subdivision of a frame. As such, a frame can include one or more code blocks. Each code block in a frame can include part of the video data for the frame. A code block contain a portion of video data along with corresponding parameters and parameter values (e.g., name/value pairs) indicating how the portion of video data is to be rendered. Code blocks of different sizes (e.g., 8×8 pixels, 16×16 pixels, 32×32 pixels, etc.) can be defined in accordance with essentially any encoding standard, including H.264 (AVC), HEVC (H.265), VP8, VP9, etc.

In this description and the following claims, "decode hardware" is defined as one or more hardware components specialized (configured, possibly through programming) to decode video data from a video bit stream, such as, for example, from code blocks. Decode hardware can include Control Processing Unit (CPU) cores, Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices.

Aspects include flexible definition and detection of surface alignment requirements for decoding hardware. Surface alignment requirements can be handled by render cropping (e.g., cropping at a video output device), through adjustment and modification of original syntax values in a video bit stream and relaxed media type negotiation in a software (host) decoder. Resolution changes can be hidden with the aligned surface allocation when applicable. Performance can be improved and power consumption reduced by using hidden resolution changes.

In general, aspects of the invention can be practiced using any of variety of different code block resolutions including: 4×4 pixels, 8×8 pixels, 16×16 pixels, 32×32 pixels, 64×64 pixels, etc. Aspects of the invention can also be practiced using an of a variety of different surface alignment requirements including: 8×8 pixels, 16×16 pixels, 32×32 pixels, 64×64 pixels, etc.

FIG. 1 illustrates an example architecture 100 that facilitates video bit stream decoding. Referring to FIG. 1, computer architecture 100 includes software decoder 101, decode hardware 107, and display device 109. Software decoder 101, decode hardware 107, and display device 109 can be connected to (or be part of) a network, such as, for example, a system bus, a Local Area Network ("LAN"), a Wide Area Network ("WAN"), and even the Internet. Accordingly, decoder 101, decode hardware 107, and display device 109 as well as any other connected computer systems and their components, can create message related data and exchange message related data, including video bit streams and video data with one another over the network.

In general, software decoder 101 is configured to receive a video bit stream and decode the video bit stream into video data for rendering at a display device, such as, a television, computer monitor, mobile device screen, or other display screen. As depicted, software decoder 101 includes decode module 102, offload module 103, and alignment module 104. Decode module 102 can include other modules, such as, for example, an entropy decoder and motion compensation module, for decoding code blocks into video data. Decoded video data can then be sent to a display device for rendering.

Decode module 102 can also include functionality for determining when a code block and decoding operations are to be offloaded to decode hardware. Decode module 102 can send a code block and decoding operations that are to be offloaded to offload module 103.

In general, offload module 103 is configured to receive a code block and decoding operations for offloading to decode hardware. Offload module 103 can establish an input buffer and an output buffer for use by the decode hardware. Offload module 103 can store a code block and decoding operations in the input buffer. The decode hardware can then access the code block and decoding operations from the input buffer. Decode hardware can store resulting video data in the output buffer. Video data in the output buffer can then be sent to a display device for rendering.

In general, alignment module 104 is configured to determine configuration settings of decode hardware and use the configuration settings to enhance video bit stream decoding. As depicted, alignment module 104 further includes query module 113. Query module 106 is configured to query decode hardware for configuration settings, including surface alignment requirements of the decode hardware. Surface alignment requirements can indicate an internal buffer size used by the decode hardware. In one aspect, query module 106 calls an Application Program Interface (API) that returns configuration settings for decode hardware.

Alignment module 104 can use surface alignment requirements to facilitate more efficient hardware decoding of code blocks from a video bit stream. Alignment module 104 can send the surface alignment requirements to offload module 103.

Offload module 103 can use the surface alignment requirements to allocate an output buffer that matches the surface alignment requirements. Use of a matching output buffer permits the decode hardware to more efficiently output video data decoded from a code block. Offload module 103 may also use the surface alignment requirements to allocate an input buffer that matches the surface alignment requirements.

Offload module 103 can also modify syntax values associated with a code block into modified syntax values. The modified syntax values can indicate that code blocks being input to the decode hardware match the surface alignment requirements of the decode hardware (even if code block size is actually smaller than the surface alignment requirements). Offload module 103 can send the modified syntax values to the decode hardware.

In one aspect, decode hardware may have modifiable configuration settings. As such, alignment module 104 can negotiate with the decode hardware to optimize configuration settings for decoding code blocks into video data.

Decode hardware 107 includes decode module 108. Decode module 108 is configured to read a code block and decoding operations from an input buffer. Decode hardware 107 can also receive (potentially modified) syntax values from a software decoder. The syntax values can indicate a (e.g., purported) resolution of code blocks in the input buffer.

Based on the received syntax values, decode hardware 107 can infer the size of an output buffer for storing decoded video data. Decode module 108 can perform decoding operations read from an input buffer on a code block read from the input buffer. Decode module 108 can output resulting video data into an internal buffer. When the actual resolution of the video data is less than the size of the internal buffer (e.g., when actual video data resolution is 8×8 pixels and internal buffer size is 32×32 pixels) remaining portions of the internal buffer are padded (e.g., are left empty and/or include spurious data). When the resolution of the internal buffer matches the resolution of the output buffer (i.e., the output buffer matches surface alignment requirements), contents of the internal buffer can be copied essentially directly into the output buffer. Video data in the output buffer can then be rendered at a display device.

However, decode hardware 107 is unware (and has little, if any way, to determine) if received syntax values differ from syntax values in a video bit stream that is being decoded. Decode hardware 107 performs decode operations and outputs video data for a specified output buffer size based on provided input.

When the actual resolution of a code block is less than the resolution of the output buffer, an output buffer can also include padding (from copying the contents of the internal buffer to the output buffer). Alignment module 104 is aware of the actual resolution of code blocks in a video bit stream (from syntax values in the video bit stream). Based on the actual resolution of code blocks, alignment module 104 can formulate cropping data defining a cropping window. Alignment module 104 can send the cropping data to a display device. The display device can use the cropping data to crop data from an output buffer that is outside of the defined cropping window.

Display device 109 is configured to receive and display video data from buffers. Display device 109 can receive and display video data from software decoders and/or hardware decoders. Display device 109 can crop portions of buffers in accordance with defined cropping windows.

Figure 2:
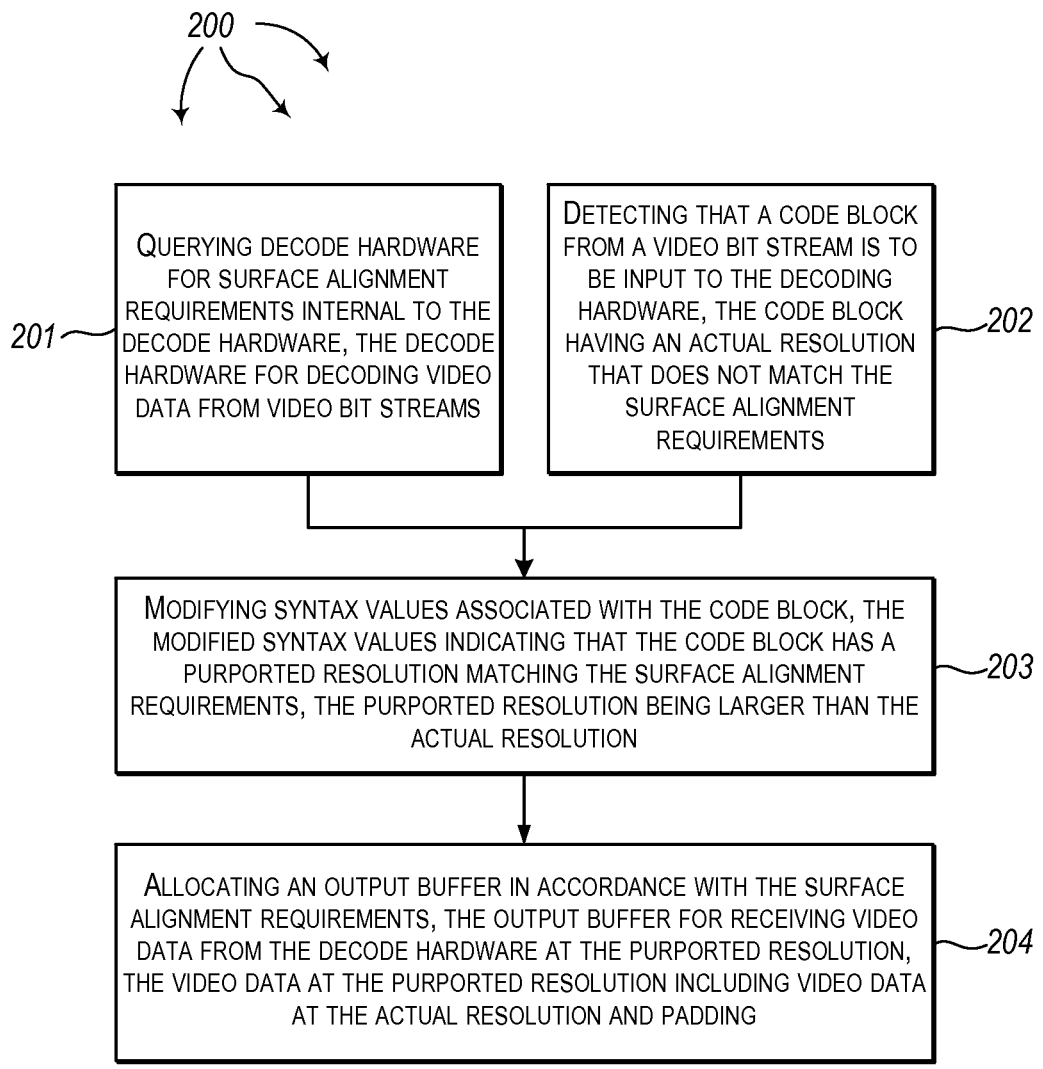
FIG. 2 illustrates a flow chart of an example method for video bit stream decoding.

FIG. 2 illustrates a flow chart of an example method 200 for video bit stream decoding. Method 200 will be described with respect to the components and data of computer architecture 100.

As depicted in FIG. 1, frames of video bit stream 121, including frames 122, 123, 124, etc., can be streamed to software decoder 101. Each frame can include one or more code blocks and syntax values. For example, frame 123 includes code blocks 123A, 123B, 123C, 123D, etc. and syntax values 133. Within the same frame, syntax values indicate code block characteristics, such as, for example, code block resolution. For example, syntax values 132 can indicate that code blocks 123A, 123B, 123C, 123D, etc. have a resolution of 8×8 pixels. Decoder module 102 can decode syntax values from a frame. For example, decoder module 102 can decode syntax values 133 from frame 123.

In general, when decoding a frame, decoder module 102 can send decoded syntax values to the other modules included in software decoder 101. For example, when decoding frame 123, decoder module 102 can send syntax values 133 to other modules included in software decoder 101.

Method 200 includes querying decode hardware for surface alignment requirements internal to the decode hardware, the decode hardware for decoding video data from video bit streams (201). For example, query module 106 can send query 113 to decode hardware 107. Query 113 can request surface alignment requirements (e.g., internal buffer size) for decode hardware 107. Decode hardware 107 can return surface alignment requirements 114 to query module 106. Surface alignment requirements 114 can indicate that the size of buffers used internally at decode hardware 107 are 32×32 pixels. Alignment module 104 can send surface alignment requirements 114 to offload module 103. Thus, offload module 103 is aware of the internal buffer size used by decode hardware 107.

In one aspect, query module 106 calls an Application Program Interface (API) that returns configuration settings for decode hardware 107.

Decode module 102 can handle decoding frames from video bit stream 121. For each frame, on a per code block basis, decode module 102 can determine if a code block is to be decoded at decode module 102 or if the code block is to be offloaded for hardware decoding. For example, decode module 102 can determine that decode code block 123A is to be decoded in software. As such, decode module 102 can decode video data 141 from code block 123A. Video data 141 can be sent to display device 109 for rendering in image 151 (an image corresponding to frame 123).

Display device 109 can receive video data 141 and render video data 141 in image 151.

Method 200 includes determining that a code block from a video bit stream is to be input to the decode hardware, the code block having an actual resolution that does not match the surface alignment requirements (202). For example, decode module 102 can determine that code block 123B (e.g., due to the complexity of associated decoding operations) is to be offloaded for hardware decoding. Decode module 102 can send code block 123B (along with associated decode operations) to offload module 103. Offload module 103 can determine that code block 123B is to be input to decode hardware 107. As described, syntax values 133 indicate that the resolution of code block 123B is 8×8 pixels and surface alignment requirements 114 indicate that the resolution of internal buffers at decode hardware 107 is 32×32 pixels. Thus, the actual resolution of code block 123B (8×8 pixels) does not match surface alignment requirements 114 (32×32 pixels).

The hardware requirements for alignment can be for individual code blocks or for frame. For example, hardware requirements may indicate that each code block is to be 32×32 aligned or that a frame is to be 32×32 aligned. When hardware requirements are for a frame, individual code blocks can potentially be different, such as, for example, 8×8 aligned.

Method 200 includes modifying syntax values associated with the code block, the modified syntax values indicating that the code block has a purported resolution matching the surface alignment requirements, the purported resolution being larger than the actual resolution (203). For example, offload module 103 can modify syntax values 133 into modified syntax values 152. Modified syntax values 152 can indicate that the resolution of code block 123B is 32×32 pixels (and thus matches surface alignment requirements 114). Offload module 103 can send modified syntax values 152 to decode hardware 107.

Method 200 includes allocating an output buffer in accordance with the surface alignment requirements, the output buffer for receiving video data output from the decode hardware at the purported resolution, the video data at the purported resolution including video data at the actual resolution and padding (204). For example, offload module 103 can allocate aligned output buffer 112. Aligned output buffer 122 is 32×32 pixels. Aligned output buffer 112 is for receiving 32×32 pixel video data from decode hardware 107.

Offload module 103 can also allocate input buffer 111. Offload module can store code block 123B along with associated decode operations in input buffer 111.

Decode module 108 can read code block 123B and associated decode operations from input buffer 111. Decode module 108 can perform the associated decode operations to decode video data 142 from block 123B. The resolution of video data 142 is 8×8 pixels (as defined in syntax values 133). Decode module 108 can store video data 142 in a sub-region of internal buffer 153. Since internal buffer 153 is 32×32 pixels, video data 142 consumes a portion, but not all, of internal buffer 153. The remaining portion of internal buffer 152 contains padding 143. Padding 143 can include data decode module 101 specifically stored in internal buffer 153. Alternately, padding 143 can include data previously stored in a memory location that was allocated for internal buffer 153 and is thus essentially random data.

Based on modified syntax values 152, decode hardware 107 is aware that aligned output buffer 112 is a 32×32 pixel buffer. As such, video data 142 and padding 143 can be copied from internal buffer 153 to aligned output buffer 112 without further buffer conversions.

Alignment module 104 generates cropping data 116 defining a cropping window. The defined cropping window can be configured to crop any data in hardware output buffers except a sub-region where actual video data from a code block is stored (e.g., an 8×8 pixel portion in the upper left hand corner). Alignment module 104 can send cropping data 116 to display device 109 to make display device 109 aware of the defined cropping window.

The contents of aligned output buffer 112 (i.e., video data 142 and padding 143) can be sent to display device 109 for rendering in image 151. Display device 109 can receive aligned output buffer 112. In accordance with the defined cropping window, display device 109 crops padding 143. Display device 109 can render video data 142 in image 152.

Operations similar to those described with respect to code block 123B can be performed to decode other code blocks in video bit stream 121 at decode hardware 107. For example, code block 123C can be decoded at decode hardware 107. Likewise, code blocks from other frames, such as, for example, frames 122 and/or 124, can also be decoded at hardware decoder 107.

As described, aspects of the invention can be practiced using any of variety of different code block resolutions including: 4×4 pixels, 8×8 pixels, 16×16 pixels, 32×32 pixels, 64×64 pixels, etc. Aspects of the invention can also be practiced using an of a variety of different surface alignment requirements including: 8×8 pixels, 16×16 pixels, 32×32 pixels, 64×64 pixels, etc.

In some aspects, alignment module 104 and decode hardware 107 conduct negotiation 119. Decode hardware 107 may have configurable settings, such as, for example, surface height. In these aspects, alignment module 104 can attempt to negotiate a surface height that is the same size as a coded picture height. In other aspects, settings, such as, for example, surface height are fixed and cannot be negotiated.

Since surfaces can be allocated with alignment requirements, some resolution changes within the aligned limit can be hidden. For example, if a surface is to be 32 height aligned and the coding height is 720, then the allocated surface height can be 736. If coding height changes but below the allocated surface height of 736, a resolution change need not be invoked. Hidden resolution changes can improve performance and power as a benefit from surface allocation with alignment.

In one aspect, a system includes decode hardware, a display device, and a software decoder. The decode hardware is for decoding video bit streams and has internal surface alignment requirement. The display device is for visually presenting video data and is capable of cropping padding from video data.

The software decoder, uses a processor, for querying the decode hardware for the internal surface alignment requirements. The software decoder, uses a processor, for determining a code block from a video bit stream is to be input to the decode hardware. The code block has an actual resolution that does not match the surface alignment requirements.

The software decoder, uses the processor, for modifying syntax values for the code block. The modified syntax values indicate that the code block has a purported resolution matching the surface alignment requirements. The purported resolution is larger than the actual resolution. The software decoder, uses the processor, for allocating an output buffer in accordance with the surface alignment requirements.

The decode hardware decodes the code block into video data at the purported resolution. The video data is aligned in accordance with the surface alignment requirements. The video data at the purported resolution includes video data at the actual resolution and padding. The decode hardware stores the video data at the purported resolution in the allocated output buffer.

The software decoder, using the processor, sends cropping data needed to perform cropping to the display device. The display device using the cropping data to crop the padding. The display renders the video data at the actual resolution in an image (corresponding to a frame of the video bit stream)

In another aspect, a method for video bit stream decoding is performed. Decode hardware is queried for surface alignment requirements internal to the decode hardware. The decode hardware is for decoding video data from video bit streams. It is determined that a code block from a video bit stream is to be input to the decode hardware. The code block has an actual resolution that does not match the surface alignment requirements.

Syntax values associated with the code block are modified. The modified syntax values indicate that the code block has a purported resolution matching the surface alignment requirements. The purported resolution is larger than the actual resolution. An output buffer is allocated. The output buffer is accordance with the surface alignment requirements. The output buffer is for receiving video data from the decode hardware at the purported resolution. The video data at the purported resolution includes video output at the actual resolution and padding.

In a further aspect, a computer program product for use at a computer system includes one or more computer storage devices having stored thereon computer-executable instructions that, in response to execution at a processor, cause the computer system to implement a method for video bit stream decoding.

The computer program product includes computer-executable instructions that, in response to execution at a processor, cause the computer system to query decode hardware for surface alignment requirements internal to the decode hardware. The decode hardware is for decoding video data from video bit streams. The computer program product includes computer-executable instructions that, in response to execution at a processor, cause the computer system to determine that a code block from a video bit stream is to be input to the decode hardware. The code block has an actual resolution that does not match the surface alignment requirements.

The computer program product includes computer-executable instructions that, in response to execution at a processor, cause the computer system to modify syntax values associated with the code block. The modified syntax values indicate that the code block has a purported resolution matching the surface alignment requirements. The purported resolution is larger than the actual resolution. The computer program product includes computer-executable instructions that, in response to execution at a processor, cause the computer system to allocate an output buffer in accordance with the surface alignment requirements. The output buffer is for receiving video data output from the decode hardware at the purported resolution. The video data at the purported resolution includes video data at the actual resolution and padding.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A system, comprising:
   a processor;
   decode hardware configured to decode code blocks;
   a display device; and
   system memory coupled to the processor and storing instructions configured to cause the processor to:
      access an internal buffer size of the decode hardware;
      decode a code block from a frame of a video bit stream into video data, wherein code blocks of the frame have a buffer size that is smaller than the internal buffer size;
      determine that another code block from the frame is to be decoded at the decode hardware;
      modify syntax values for the other code block to indicate that the other code block has a purported buffer size matching the internal buffer size of the decode hardware;
      send the modified syntax values and the other code block to the decode hardware;
      access an output buffer of the internal buffer size that includes other video data and padding from the decode hardware, the other video data being decoded from the other code block; and
      send the video data, the output buffer, and cropping data to the display device to render the frame at the display device, the cropping data defining a cropping window at the display device to crop the padding from the output buffer.

2. The system of claim 1, wherein the decode hardware is additionally configured to:
   decode the other code block into the other video data, the other video data being aligned in accordance with surface alignment requirements, the other video data comprising padding.

3. The system of claim 2, wherein the instructions are additionally configured to cause the processor to allocate the output buffer in accordance with the surface alignment requirements.

4. The system of claim 3, wherein the decode hardware is configured to store the other video data in the allocated output buffer.

5. The system of claim 1, wherein the instructions are additionally configured to cause the processor to, prior to modifying the syntax values for the other code block, negotiate a media type with the decode hardware.

6. The system of claim 1, wherein accessing the internal buffer size of the decode hardware comprises calling an Application Program Interface (API) that returns configuration settings for the decode hardware.

7. The system of claim 1, wherein the video bit stream is formatted in accordance with one of an H.264 format, a High Efficiency Video Coding (HEVC) format, a VP8 format, or a VP9 format.

8. The system of claim 1, wherein:
the buffer size of the code blocks of the frame is one of 8 pixels by 8 pixels or 16 pixels by 16 pixels; and
the internal buffer size of the decode hardware is one of 32 pixels by 32 pixels or 64 pixels by 64 pixels.

9. A method for adjusting bit streams for hardware decoder requirements, the method being implemented by a computer system, the method comprising:
accessing an internal buffer size of decode hardware, the decode hardware being configured to decode code blocks;
decoding a code block from a frame of a video bit stream into video data, wherein code blocks of the frame have a buffer size that is smaller than the internal buffer size;
determining that another code block from the frame is to be decoded at the decode hardware;
modifying syntax values associated with the other code block to indicate that the code block has a purported buffer size matching the internal buffer size;
sending the modified syntax values and the other code block to the decode hardware;
accessing an output buffer of the internal buffer size that includes other video data and padding from the decode hardware, the other video data being decoded from the other code block; and
sending the video data, the output buffer, and cropping data to a display device to render the frame at the display device, the cropping data defining a cropping window at the display device to crop the padding from the output buffer.

10. The method of claim 9, further comprising, prior to modifying the syntax values associated with the other code block, negotiating a media type with the decode hardware.

11. The method of claim 9, wherein accessing the internal buffer size of the decode hardware comprises calling an Application Program Interface (API) that returns configuration settings for the decode hardware.

12. The method of claim 9, wherein the video bit stream is formatted in accordance with one of an H.264 format, a High Efficiency Video Coding (HEVC) format, a VP8 format, or a VP9 format.

13. The method of claim 9, further comprising decoding the other code block into the other video data, the other video data being aligned in accordance with surface alignment requirements, the other video data comprising padding.

14. The method of claim 13, further comprising allocating the output buffer in accordance with the surface alignment requirements.

15. The method of claim 14, further comprising storing the other video data in the allocated output buffer.

16. The method of claim 9, wherein:
the buffer size of the code blocks of the frame is one of 8 pixels by 8 pixels or 16 pixels by 16 pixels; and
the internal buffer size of the decode hardware is one of 32 pixels by 32 pixels or 64 pixels by 64 pixels.

17. A non-transitory computer-readable medium having stored thereon computer-executable instructions that, when executed by a processor, cause a computer system to:
access an internal buffer size of decode hardware, the decode hardware being configured to decode code blocks;
decode a code block from a frame of a video bit stream into video data, wherein code blocks of the frame have a buffer size that is smaller than the internal buffer size;
determine that another code block from the frame is to be decoded at the decode hardware;
modify syntax values associated with the other code block, to indicate that the code block has a purported buffer size matching the internal buffer size;
send the modified syntax values and the other code block to the decode hardware;
access an output buffer of the internal buffer size that includes other video data and padding from the decode hardware, the other video data being decoded from the other code block; and
send the video data, the output buffer, and cropping data to a display device to render the frame at the display device, the cropping data defining a cropping window at the display device to crop the padding from the output buffer.

18. The non-transitory computer-readable medium of claim 17, wherein execution of the computer-executable instructions additionally causes the computer system to, prior to modifying the syntax values associated with the other code block, negotiate a media type with the decode hardware.

19. The non-transitory computer-readable medium of claim 17, wherein accessing the internal buffer size of the decode hardware comprises calling an Application Program Interface (API) that returns configuration settings for the decode hardware.

20. The non-transitory computer-readable medium of claim 17, wherein the video bit stream is formatted in accordance with one of an H.264 format, a High Efficiency Video Coding (HEVC) format, a VP8 format, or a VP9 format.

* * * * *